(12) United States Patent
Garcia (10) Patent No.: US 7,933,808 B2
(45) Date of Patent: Apr. 26, 2011

(54) RENTAL NETWORK SECURITY SYSTEM AND METHOD

(76) Inventor: John Andrew Garcia, Arlington, VA (US)

( * ) Notice: Subject to any disclaimer, the term of this patent is extended or adjusted under 35 U.S.C. 154(b) by 234 days.

(21) Appl. No.: 11/970,265

(22) Filed: Jan. 7, 2008

(65) Prior Publication Data

US 2009/0177577 A1  Jul. 9, 2009

(51) Int. Cl.
*G06Q 30/00* (2006.01)
(52) U.S. Cl. ......................................................... 705/26
(58) Field of Classification Search ................... 705/26, 705/27
See application file for complete search history.

(56) References Cited

U.S. PATENT DOCUMENTS

| | | | |
|---|---|---|---|
| 4,965,821 A * | 10/1990 | Bishop et al. ................. | 455/409 |
| 5,367,148 A | 11/1994 | Storch et al. | |
| 6,000,832 A * | 12/1999 | Franklin et al. ............... | 700/232 |
| 6,240,365 B1 * | 5/2001 | Bunn ............................ | 701/213 |
| 6,389,403 B1 | 5/2002 | Dorak, Jr. | |
| 6,853,987 B1 * | 2/2005 | Cook ............................ | 705/75 |
| 6,885,998 B1 * | 4/2005 | Arduino ........................ | 705/26 |
| 2002/0186144 A1 * | 12/2002 | Meunier ................... | 340/825.28 |
| 2003/0093328 A1 * | 5/2003 | Koons .......................... | 705/26 |
| 2003/0120509 A1 | 6/2003 | Bruch et al. | |
| 2004/0098319 A1 | 5/2004 | Senker | |
| 2004/0122685 A1 * | 6/2004 | Bunce ............................. | 705/1 |
| 2005/0060210 A1 | 3/2005 | Levi et al. | |
| 2005/0091087 A1 | 4/2005 | Smith et al. | |
| 2006/0173794 A1 | 8/2006 | Sellars et al. | |
| 2006/0224449 A1 * | 10/2006 | Byerley et al. ................. | 705/14 |
| 2007/0027708 A1 | 2/2007 | Brown et al. | |
| 2007/0088588 A1 | 4/2007 | Schaffer | |
| 2007/0156429 A1 | 7/2007 | Godar | |
| 2007/0174083 A1 | 7/2007 | Silverman et al. | |
| 2008/0086315 A1 * | 4/2008 | Beatrez ............................. | 705/1 |

OTHER PUBLICATIONS

Dana et al. "Revenue Sharing and Vertical Control in the Video REntal Industry", The Journal of Industrial Economics, vol. XLIX, No. 33, Sep. 2001, pp. 223-245.*

* cited by examiner

Primary Examiner — Naeem Haq
(74) Attorney, Agent, or Firm — Greenblum & Bernstein, P.L.C.

(57) ABSTRACT

A system and method of facilitating a rental transaction of a tangible item is provided. Initially, a lessee pickup code is communicated from a borrowing party to an owning party upon exchanging the tangible item between the owning party and the borrowing party. The owning party subsequently transmits the lessee pickup code to a central controller. A rental period for the exchanged tangible item begins upon verifying, by the central controller, that the lessee pickup code sent by the owning party is the lessee pickup code originally provided to the borrowing party. When the tangible item is returned to the owning party, the owning party communicates a return code to the borrowing party. The return code is transmitted by the borrowing party to the central controller. The central controller verifies that the return code is the return code originally provided to the owning party.

69 Claims, 4 Drawing Sheets

RENTAL NETWORK SECURITY SYSTEM AND METHOD

BACKGROUND OF THE DISCLOSURE

1. Field of the Disclosure

The present disclosure relates to the exchange of a rental item between an owner and borrower, and more particularly, enabling a rental transaction between the owner and the borrower by exchanging codes among the owner, the borrower and a central controller.

2. Background Information

Current technologies allow consumers to borrow, rent and purchase goods from other consumers. Internet websites enable property owners to list property for exchange, rental or purchase such that they may reach a population of likeminded consumers. Consumers wishing to exchange goods or rent or buy goods from the property owners may view listings and choose to contract with a particular property owner. Once the consumer has contacted the particular property owner and entered into an agreement regarding the terms of the exchange, rental or purchase, the involvement of the Internet website ceases.

That is, there are no procedures to ensure that the borrower receives the correct good or goods, that the good is in an acceptable condition, that the good is returned to the owner and that the good is returned in a condition acceptable to the owner. Additionally, these technologies do not include procedures for dealing with failure to return a good or damage to the returned good that are specific to the good being exchanged, rented or purchased.

SUMMARY OF THE INVENTION

Advantageously, the present invention provides a secure model which facilitates transactions among parties unfamiliar with one another. Thus, parties may be assured, by the system, of recompense if so warranted by their interactions with each other. The parties may be assured, despite the fact that the parties may not trust each other. The recompense provides sufficient assurance and incentive to attract owners of valuable rental items to utilize the system and method.

According to one advantage of the present invention, there is provided a peer-to-peer system in which rental items and exchanged goods are stored at distributed locations. The present invention does not require that the tangible items be stored at a centralized location. Rather, the present invention leverages existing, distributed inventories of various owners (e.g., pawn shop owners, homeowners, contractors and rental companies).

Another advantage of the present disclosure is the provision for protecting the owner from the consequences associated with a stolen rental item by charging a replacement cost value to the borrower (e.g., to the borrower's credit card or debit account). In one non-limiting embodiment, the replacement cost value is charged to the borrower at the outset of the rental transaction, and is posted to the borrower's account if the rental item is lost or stolen. The replacement cost value charge is voided if the borrower returns the rental item at the end of the rental transaction.

Yet another advantage of the present disclosure are reviews and ratings provided for both an owner and a potential borrower to obtain information about the conduct of an owner or a borrower in a prior rental transaction. In one non-limiting embodiment of the present disclosure, reviews and ratings indicate characteristics associated with the rental item (e.g., history, dependability, quality and performance of a good). Thus, a potential borrower may be assured of the quality of the rental item.

One advantage of the present disclosure is the provision for contacting a party using the stored user identifiers for the borrower or the owner to reschedule the return of the rental item. Advantageously, anonymity as to the borrower and/or the owner is not a required feature of the present invention.

According to another advantage of the present invention, the exchange of codes and in particular, a pickup code, prevents an owner from fraudulently claiming that a borrower inspected, verified the condition of or obtained possession and/or control of a rental item. The exchange of codes and in particular, a received code, prevents an owner from fraudulently claiming that a rental item was never returned by a borrower and prevents a borrower from fraudulently claiming that the rental item was returned to the owner.

Another advantage of exchanging codes in a rental transaction is the prevention of fraud on the part of the borrower. The method verifies codes submitted by the borrower to ensure that the borrower has not altered the terminating digit of the received code prior to sending it to the central controller.

Another advantage of the present disclosure is that a listing of repair costs and replacement value costs are provided to a potential borrower prior to the start of the rental transaction.

According to one aspect of the present disclosure, a method of facilitating a rental transaction of a tangible item is provided. The method may include communicating a lessee pickup code from a lessee to a lessor upon exchanging the tangible item between the lessor and the lessee. The method further may include electronically transmitting the lessee pickup code from the lessor to the central controller. The method also may include initiating a rental period upon verifying, by the central controller, the lessee pickup code. The method further may include communicating a return code from the lessor to the lessee upon return of the tangible item to the lessor and electronically transmitting the return code from the lessee to the central controller.

According to another aspect of the present disclosure, the method also may include electronically transmitting the lessee pickup code, generated by the central controller, to the lessee.

According to yet another aspect of the present disclosure, the method also may include electronically transmitting multiple return codes, generated by the central controller, to the lessor.

According to a further aspect of the present disclosure, the return code is selected by the lessor from the multiple return codes.

According to a still further aspect of the present disclosure, the lessor adds a user identifier associated with the lessor to the return code.

According to another aspect of the present disclosure, the method also may include verifying, based on a comparison of the user identifier added to the return code and multiple user identifiers for the lessor stored at the central controller, that the return code submitted by the lessee may include the return code generated by the central controller and electronically transmitted to the lessor.

According to yet another aspect of the present disclosure, the lessee adds a user identifier associated with the lessee to the lessee pickup code.

According to a further aspect of the present disclosure, verifying the lessee pickup code may include comparing the user identifier added to the lessee pickup code and multiple user identifiers for the lessee stored at the central controller, and determining that the lessee pickup code submitted by the lessor may include the lessee pickup code generated by the central controller and electronically transmitted to the lessee.

According to a still further aspect of the present disclosure, the method may include electronically transmitting, from the central controller, a commencement message confirming commencement of the rental period.

According to another aspect of the present disclosure, the method may include electronically transmitting a confirmation message from the central controller to the lessee indicating receipt of the return code.

According to another aspect of the present disclosure, the return code indicates that the tangible item was returned to the lessor.

According to yet another aspect of the present disclosure, at least a portion of the return code may indicate a level of damage to the tangible item.

According to still another aspect of the present disclosure, the portion of the return code is identifiable by the lessee and the lessor as indicating the level of damage.

According to a further aspect of the present disclosure, the lessee pickup code and the return code are electronically transmitted by at least one of: Bluetooth, short messaging system, electronic mail, dual-tone multi-frequency (DTMF) signaling, intranet, Internet and wireless communication.

According to a still further aspect of the present disclosure, the lessee pickup code and the return code are randomly generated by the central controller.

According to another aspect of the present disclosure, the lessee pickup code and the return code include sequences of randomly generated alphanumeric characters.

According to yet another aspect of the present disclosure, the lessee pickup code and the return code are communicated via at least one of electronic and physical transmission.

According to one aspect of the present disclosure, there is provided a method of facilitating the rental of at least one tangible item, the tangible item being transferred between a lessee and a lessor. The method may include electronically transmitting a lessee pickup code to the lessee and electronically transmitting multiple return codes to lessor. The method further may include verifying submission of the lessee pickup code by the lessor upon receiving the lessee pickup code from the lessor, the lessee communicating the lessee pickup code to the lessor upon obtaining possession of the tangible item. The method also may include verifying submission of a return code by the lessee upon receiving the return code from the lessee, the lessor communicating the return code to the lessee upon return of the tangible item. The lessor selects the return code from the multiple return codes.

According to another aspect of the present disclosure, a central controller receives the lessee pickup code and the return code, and the central controller verifies the submission of the lessee pickup code and the return code.

According to yet another aspect of the present disclosure, the method may include electronically transmitting, from the central controller, a message confirming commencement of a rental period upon receiving the lessee pickup code.

According to a further aspect of the present disclosure, the return code is invalid after the expiration of the rental period.

According to a still further aspect of the present disclosure, the central controller extends the rental period by electronically transmitting at least one additional return code to the lessor.

According to another aspect of the present disclosure, the central controller extends the rental period by prompting the lessee to electronically transmit the return code.

According to yet another aspect of the present disclosure, a lessee user identifier is added to the lessee pickup code, and a lessor user identifier is added to the return code.

According to a further aspect of the present disclosure, the lessee pickup code is verified by the central controller based on a comparison of the lessee user identifier and multiple user identifiers stored at the central controller, and the return code is verified by the central controller based on a comparison of the lessor user identifier and the multiple user identifiers stored at the central controller.

According to another aspect of the present disclosure, the multiple user identifiers include: a telephone number, an email address, an account number, a user name, a system-generated identifier and an Internet Protocol (IP) address.

According to yet another aspect of the present disclosure, each of the multiple return codes indicate a degree of damage sustained by the tangible item.

According to a still further aspect of the present disclosure, the lessor selects the return code from the multiple of return codes based on the degree of damage sustained by the tangible item.

According to another aspect of the present disclosure, the lessee pickup code and the return codes are communicated via at least one of electronic and physical transmission.

According to one aspect of the present disclosure, there is provided a system for facilitating the exchange of at least one tangible item, the tangible item being exchanged between a lessor and a lessee. The system may include a first interface to electronically transmit a lessee pickup code to the lessee and a second interface to electronically transmit a return code to the lessor. The system also may include a first verifying processor to verify submission of the lessee pickup code by the lessor upon receiving the lessee pickup code from the lessor, the lessee communicating the lessee pickup code to the lessor upon obtaining possession of the tangible item. The system also may include a second verifying processor to verify submission of the return code by the lessee upon receiving the return code from the lessee, the lessor communicating the return code to the lessee upon return of the tangible item.

According to another aspect of the present disclosure, the system also may include a reimbursement policy to determine a reimbursement value to compensate the lessor for either damage to or loss of the tangible item.

According to yet another aspect of the present disclosure, the reimbursement value is based on one of: a repair cost and a replacement cost for the tangible item.

According to a still further aspect of the present disclosure, the reimbursement policy may include: information associated with the tangible item, the replacement cost, a rental fee and at least one repair cost based on a degree of damage to the tangible item.

According to another aspect of the present disclosure, the replacement cost is determined based on information obtained from at least one of the Internet and an auction site.

According to yet another aspect of the present disclosure, the lessee pickup code and the return code are communicated via at least one of electronic and physical transmission.

According to one aspect of the present disclosure, there is provided a tangible computer readable medium storing a program executable to facilitate the exchange of at least one tangible item, the tangible item being exchanged between a lessor and a lessee. The medium may include a first transmission code to electronically transmit a lessee pickup code to the lessee and a second transmission code to electronically transmit multiple return codes to the lessor. The medium may include a first receiving code executable to receive the lessee pickup code from the lessor, the lessee communicating the lessee pickup code to the lessor upon obtaining possession of the tangible item. The medium also may include a first verifying code to verify submission of the lessee pickup code by the lessor. The medium also may include a second receiving code to receive the return code from the lessee, the lessor communicating the return code to the lessee upon return of the tangible item. The medium also may include a second verifying code to verify submission of the return code by the lessee.

According to one aspect of the present disclosure, there is provided a method of mitigating risk in a business transaction. The method may include electronically communicating an initiating code to a first party and electronically communicating a terminating code to a second party. The method also may include verifying submission of the initiating code by the second party upon receiving the initiating code from the first party, the first party communicating the initiating code to the second party upon an occurrence of a first event. The method also may include verifying submission of the terminating code by the first party upon receiving the terminating code from the second party, the second party communicating the terminating code to the first party upon occurrence of a second event.

According to another aspect of the present disclosure, the business transaction is conducted in accordance with a transaction agreement.

According to yet another aspect of the present disclosure, the terminating code is selected from multiple terminating codes electronically communicated to the second party.

According to still another aspect of the present disclosure, the multiple codes indicate a degree to which the business transaction varies from the transaction agreement.

According to a further aspect of the present disclosure, the transaction agreement designates a value for compensating the second party.

According to a still further aspect of the present disclosure, the first event initiates the business transaction.

According to yet another aspect of the present disclosure, the second event terminates the business transaction.

According to another aspect of the present disclosure, the initiating code and the terminating code are randomly generated by a central controller.

According to yet another aspect of the present disclosure, the initiating code and the terminating code include sequences of randomly generated alphanumeric characters.

According to a further aspect of the present disclosure, the initiating code and the terminating code are electronically communicated by at least one of: Bluetooth, short messaging system, electronic mail, dual-tone multi-frequency (DTMF) signaling, intranet, Internet and wireless communication.

According to still further aspect of the present disclosure, a first party user identifier is added to the initiating code, and wherein a second party user identifier is added to the terminating code.

According to another aspect of the present disclosure, the initiating code is verified by the central controller based on a comparison of the first party user identifier and multiple user identifiers stored at the central controller and the terminating code is verified by the central controller based on a comparison of the second party user identifier and the multiple user identifiers stored at the central controller.

According to yet another aspect of the present disclosure, the multiple user identifiers include: a telephone number, an email address, an account number, a user name, system-generated identifier and an Internet Protocol (IP) address.

According to a further aspect of the present disclosure, the initiating code and the terminating code are communicated via at least one of electronic and physical transmission.

According to one aspect of the present disclosure, there is provided a system for facilitating a business transaction between a first party and a second party. The system may include a first interface to electronically communicate an initiating code to the first party and a second interface to electronically communicate a terminating code to the second party. The system also may include a first verifying processor to verify submission of the initiating code by the second party upon receiving the initiating code from the second party, the first party communicating the initiating code to the second party upon an occurrence of a first event. The system also may include a second verifying processor to verify submission of the terminating code by the first party upon receiving the terminating code from the first party, the second party communicating the terminating code to the first party upon an occurrence of second event.

According to another aspect of the present disclosure, the business transaction is a sale of property.

According to yet another aspect of the present disclosure, the first event may include exchanging the property between the second party and first party.

According to a further aspect of the present disclosure, the second event may include exchanging monetary consideration associated with a value of the property between the first party and the second party.

According to another aspect of the present disclosure, the initiating code and the terminating code are communicated via at least one of electronic and physical transmission.

According to another aspect of the present disclosure, a tangible computer readable medium storing a program executable to mitigate risk in a business transaction is provided. The medium may include a first transmission code to electronically transmit an initiating code to a first party and a second transmission code to electronically transmit a terminating code to a second party. The medium also may include a first verifying code to verify submission of the initiating code by the second party upon receiving the initiating code from the first party, the first party communicating the initiating code to the second party upon an occurrence of a first event. The medium also may include a second verifying code to verify submission of the terminating code by the first party upon receiving the terminating code from the second party, the second party communicating the terminating code to the first party upon occurrence of a second event.

Other exemplary embodiments and advantages of the present invention may be ascertained by reviewing the present disclosure and the accompanying drawings, and the above description should not be considered to limit the scope of the present invention.

BRIEF DESCRIPTION OF THE DRAWINGS

The present disclosure provides the detailed description that follows by reference to the noted drawings by way of non-limiting examples, in which like reference numerals represent similar parts throughout several views of the drawings, and in which.

DETAILED DESCRIPTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

The following explains an exemplary transaction according to a non-limiting embodiment using the term "owner" and "borrower;" however it is understood by those skilled in the art that the "owner" could also be a consignee, agent or any other person associated with the owner. Persons skilled in the art may readily appreciate that the term "owner" may encompass a person, entity or group of people. For example, a person may list a rental item belonging to a family member, coworker or friend.

Similarly, the "borrower" could be an agent or any other person associated with the borrower. Persons skilled in the art may readily appreciate that the term "borrower" may encompass a person, entity or group of people. For example, a person may execute a lease agreement so that a family member, coworker or friend can borrow the rental item.

The term business transaction as used herein is merely exemplary and does not limit the present invention to a rental transaction. Indeed, the exchange of codes may be used to signify the beginning and end of either a rental transaction or any suitable business transaction. For example, codes may be exchanged for a business transaction involving valet services, the repair of an item, the contracting of a service, the exchange or barter of goods or the sale of property.

Figure 1:
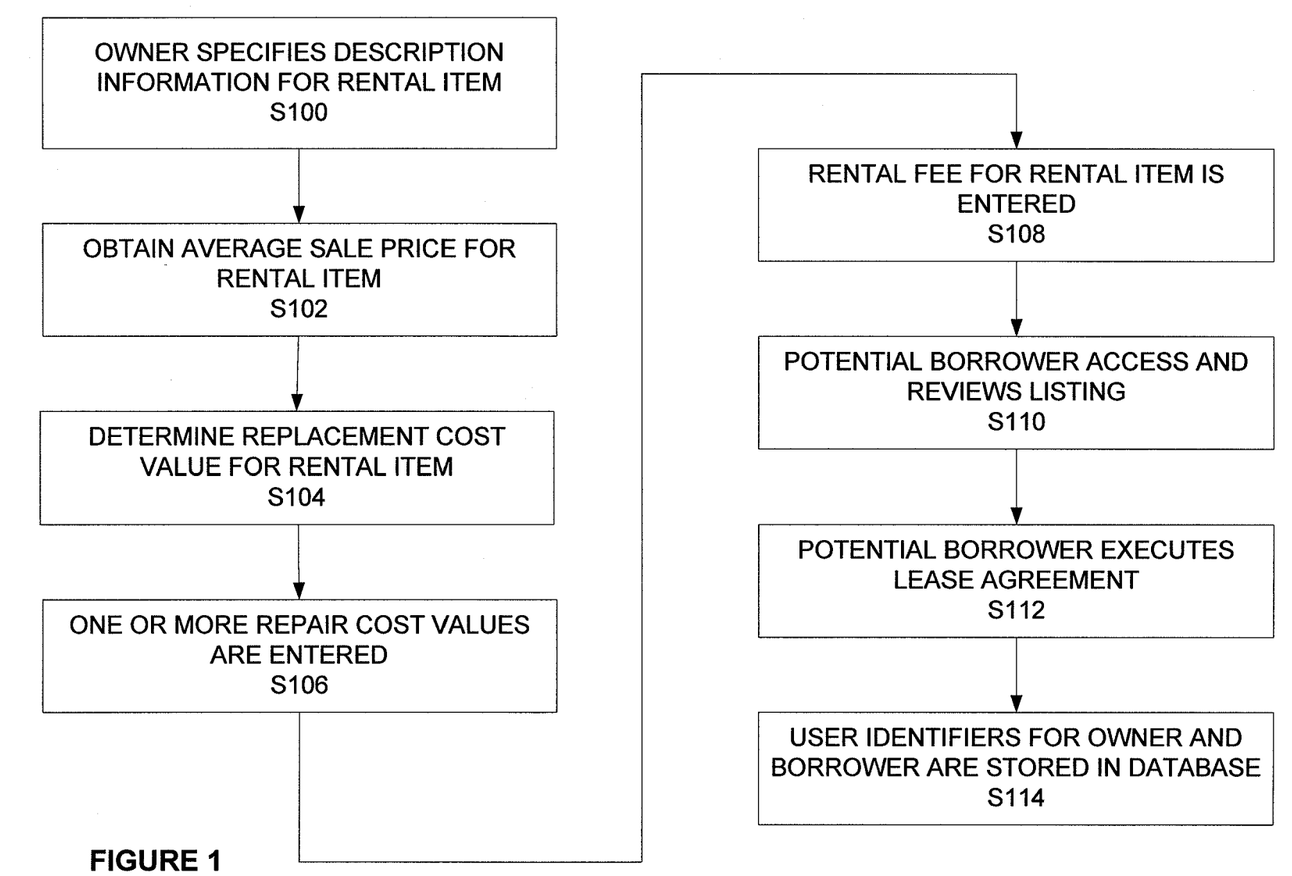
FIG. 1 is a process flow diagram for listing a rental item of the present disclosure.

Referring now to FIG. 1, a process flow diagram for listing a rental item of the present disclosure is shown. Initially, in step S100, an owner enters description information about the rental item. In an exemplary embodiment, the rental item is a car and description information includes the make, model, color, vehicle identification number (VIN) and date of purchase; however, those skilled in the art would readily appreciate that any tangible item may be the rental item, including but not limited to sporting goods, clothing, electronics, and the like. In step S102, an average sale price for the rental item is obtained from the Internet, online marketplace or other source prior to the rental transaction. In one embodiment, the average sale price is based on average sale prices or replacement cost values for similar rental items in previous rental transactions. In another embodiment, the average sale price is arbitrarily specified by the owner. Alternatively, the process proceeds to step S104 without obtaining an average sale price. Next, in step S104, a replacement cost value for the rental item is entered by the owner prior to the rental transaction. In one embodiment, the replacement cost value is equal to the average sale price for the rental item. In another embodiment, the owner determines the replacement cost value for the rental item. A replacement cost value determined by the owner is displayed along with the average sale price for the rental item. In one non-limiting embodiment, an Ebay, Inc. application programming interface (API) or other search engine is used to search for the replacement cost value and to populate the listing with the obtained replacement cost value. The owner may alter the replacement cost value. The borrower may be shown both the replacement cost value obtained from the Ebay, Inc. API and the altered replacement cost value. Advantageously, providing both values to a potential borrower discourages owners from listing replacement cost values that are disproportionate to the value of the rental item.

Subsequently, in step S106, the owner enters one or more values for repair costs associated with a damaged rental item. Repair cost values entered by the owner are representative of a condition of the rental item upon return to the owner. Each repair cost value indicates a differing degree to which the rental item is damaged during a rental period. In one embodiment, a minor damage repair cost value indicates that a rental item is returned in a condition such that the rental item may be rented again and a major damage repair cost value indicates that a rental item that is no longer in a condition to be rented. In another embodiment, no repair cost values are entered. Repair cost values are typically less than the replacement cost value entered by the owner. In step S108, the owner enters a rental fee for the rental item. Next, in step S110, a potential borrower accesses and reviews the description information in the listing for the rental item. The ordering of steps S100 through S108 shown in FIG. 1 and discussed above is exemplary. Steps S100 through S108 may be performed in any order and are not limited to the ordering shown in FIG. 1 and discussed above. Finally, in step S112, the potential borrower executes a lease agreement. The term execute as used herein means that the potential borrower demonstrates a desire to carry out the rental transaction in the manner prescribed by law. For example, the potential borrower may electronically sign an electronic lease agreement. The potential borrower may demonstrate the desire to carry out the rental transaction by clicking on a hyperlink or web button on an Internet website. The manner in which the potential borrower executes the lease agreement is not limited to the examples provided herein. Rather, those skilled in the art would readily appreciate that the potential borrower may demonstrate his or her desire to carry out the rental transaction in a number of ways. In one embodiment, the potential borrower demonstrates the desire to carry out the rental transaction by providing the pickup code to the owner. Upon executing the lease agreement, the lease agreement is stored by a central controller in a database along with user identifiers for both the borrower and the owner. User identifiers include, but are not limited to: cellular telephone number, landline telephone number, electronic mail address, postal address, username for a website, credit card information, account information, a system-generated identifier, social security number and Internet Protocol (IP) address. Subsequently, the rental transaction proceeds.

Figure 2:
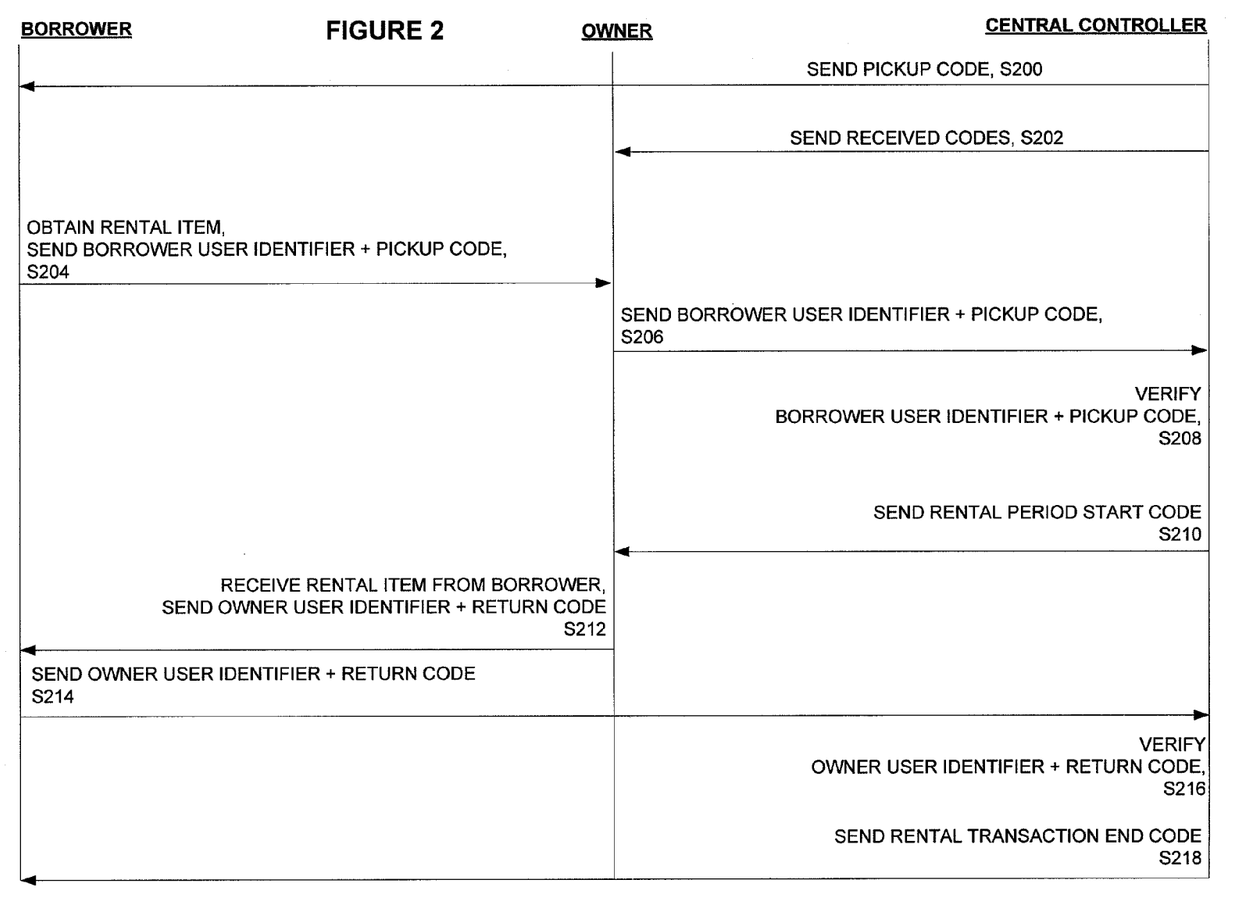
FIG. 2 is a process flow diagram for a rental transaction of the present disclosure.

Referring now to FIG. 2, a process flow diagram for a rental transaction of the present disclosure is shown. In step S200, the central controller generates and sends a pickup code to a borrower. In step S202, the central controller generates and sends multiple received codes to the owner. Alternatively, the method is operable with and the central controller may generate and send a single received code that indicates that the rental item has been returned. Subsequently, in step S204, the borrower verifies the condition of the rental item, appends, pre-pends or otherwise includes a user identifier with the pickup code and provides the pickup code to the owner. Sending the pickup code to the owner indicates that the borrower is in possession of the rental item and is satisfied with the condition of the rental item. Next in step S206, the owner sends the pickup code to the central controller. Sending the pickup code to the central controller indicates that the owner and the borrower have exchanged the rental item.

In step S208, the central controller verifies that the pickup code received from the owner corresponds to the pickup code generated for and initially sent to the borrower in step S200. The database of the central controller stores a relation between the pickup code and one or more user identifiers for the borrower. The central controller accesses the database to determine whether the pickup code corresponds to the borrower, based on a lookup using the user identifier that is either appended, pre-pended or otherwise included with the pickup code. In one embodiment, the central controller sends a first verification message to either or both the owner and the borrower indicating that the pickup code was verified. Next, in step S210, the central controller sends a rental period start code to the owner confirming the start of a rental period for the rental item exchanged between the owner and borrower. The rental period is a period of time agreed upon prior to the start of the rental transaction for which the borrower remains in possession of the rental item. During the rental period, the borrower maintains possession of the rental item. With regard to the terms "possession" and "control," it will be readily appreciated by persons skilled in the art to mean the accomplishment of a first event in a business transaction. With regard to the terms of the exemplary rental transaction, a borrower may be considered to have obtained possession of a rental item when the borrower demonstrates or evidences his or her desire to continue the rental transaction.

At the end of the rental period, in step S212, the borrower returns the good to the owner. The owner selects one of the multiple received codes initially sent by the central controller at the start of the rental transaction. The selected received code is pre-pended or otherwise included with a user identifier for the owner and sent to the borrower. Alternatively, if a single received code was provided to the owner at the start of the rental transaction, the single received code is pre-pended or otherwise included with a user identifier for the owner and sent to the borrower. At minimum, the selected received code indicates that the rental item was returned to the borrower. The selected received code may be from a plurality of received codes, each of which also indicates a different condition of the returned rental item. The condition of the returned rental item is indicated by a condition assessment or damage assessment made by the owner in selecting the received code to send to the borrower. The damage assessment indicates the degree to which the rental item was damaged during the rental period. For example, the received code may also indicate that there is no damage to the returned rental item, that there is minor damage to the returned rental item or that there is major damage to the returned rental item. The present disclosure is not limited to a particular number of degrees of damage nor is the present disclosure limited to particular qualities of degrees of damage. Further, the received codes may indicate, either in addition to the condition of the returned rental item or in the alternative, other characteristics of the rental transaction. For example, the received codes may indicate the timeliness of return of the rental item, the owner's satisfaction with the rental transaction and the like.

In step S214, the borrower sends the received code to the central controller. Codes may be communicated among the central controller, the borrower and the owner via electronic and physical transmission. Next, in step S216, the central controller verifies that the received code sent by the borrower in step S214 corresponds to one of the received codes generated for and initially sent to the owner at the start of the rental transaction in step S200. The database of the central controller stores a relation between the received code and one or more user identifiers for the owner. The central controller accesses the database to determine whether the received code corresponds to the owner, based on a lookup using the user identifier that is pre-pended to or otherwise included with the received code. The central controller verification of the received code is performed to ensure that the owner is not submitting an invalid received code to the borrower and that the borrower is not submitting an invalid received code to the central controller. In other words, the owner must send the borrower one of the multiple received codes generated and initially sent by the central controller at the start of the transaction. The borrower must send, to the central controller, the same received code the borrower receives from the owner. In one embodiment, the central controller sends a first verification message to either or both the owner or borrower indicating that the received code was verified.

In another embodiment, the central controller verifies the received code based on user identifiers for the borrower. In this embodiment, at the outset of the rental transaction, user identifiers for the borrower, user identifiers for the owner, the received codes and the pickup code are associated with each other, stored in the database and identified as relating to the same rental transaction. The borrower transmits the received code to the central controller via a mode of communication. The mode of communication is used to verify that the received code was originally generated for and sent to the owner. For example, if the borrower transmits the received code to the central controller via a text message from a cellular telephone, the central controller may use the cellular telephone number from which the text message is received to perform a lookup in the database. Alternatively, the borrower may pre-pend a user identifier for the borrower to the received code. The central controller can also use the pre-pended user identifier for the borrower (e.g., cellular telephone number, email address, IP address) to perform the lookup in the database. The information stored for the rental transaction between the owner and borrower will indicate that the received code is received from a borrower that is associated with an owner to whom the received code was originally sent. Those skilled in the art may readily appreciate that the same options are available for verifying a pickup code submitted by an owner at the beginning of the rental period. Finally, in step S218, the central controller sends a rental transaction end code to the borrower indicating that the rental transaction has completed.

The pickup code and the received codes are preferably alphanumeric strings, and may include special characters (e.g., $ # & !), but may be any suitable data representation. The pickup code and the received codes are communicated among the borrower, the owner and the central controller via modes of communication including, but not limited to: bluetooth technology, short messaging system (SMS) communication, dual-tone multi-frequency (DTMF) signaling, telephonic communication, cellular communication, an intranet, the Internet and wireless communication. The codes may be provided to a user device including, but not limited to: a mobile device, a palmtop computer, a desktop computer, laptop computer, personal computer (PC), tablet PC, personal digital assistant (PDA), set-top box (STB), communications device, a wireless telephone, a landline telephone and any other electronic device that provides audio, video or data communication. The codes may be contained in an SMS message, an electronic mail, an instant message and a Hyper-text Transfer Protocol (HTTP) post to a website.

Figure 3:
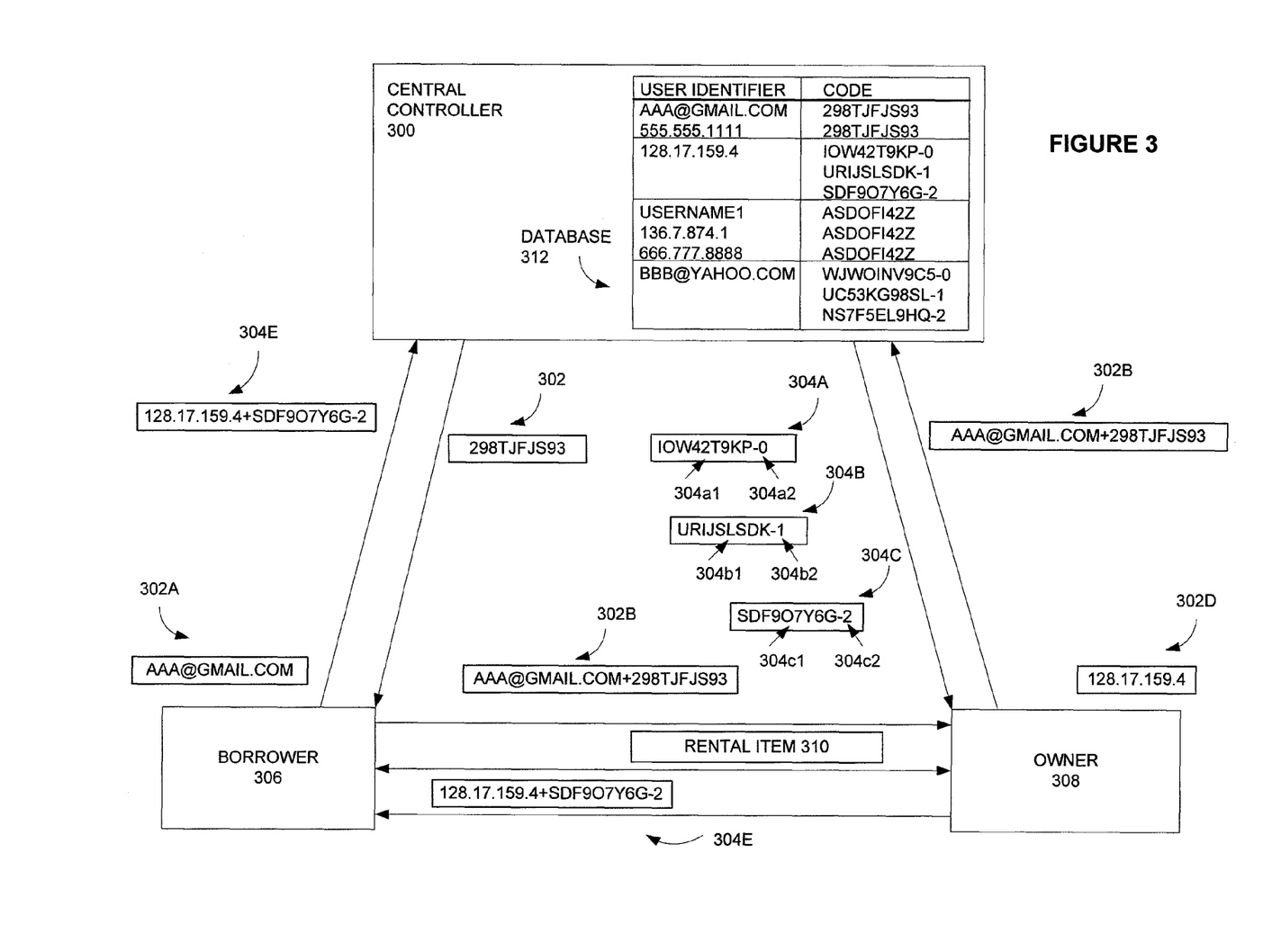
FIG. 3 illustrates a system diagram of the present disclosure.

Referring now to FIG. 3, a system diagram of a non-limiting embodiment of the present disclosure is shown.

Although the following occurs in the below-described order, those skilled in the art would readily appreciate that the following steps may occur in any suitable order. Initially, the central controller 300 generates pickup code 302 and received codes 304a-c, which are preferably sequences of alphanumeric characters, but may be any suitable data representation. The pickup code 302 is sent to the borrower 306 and the received codes 304a-c are sent to the owner 308; however, in alternative embodiments more than one pickup code 302 may be utilized, and/or fewer or greater than three received codes 304a-c may be utilized. The received codes 304a-c preferably include a terminating digit 304a2-304c2 terminating the sequence of alphanumeric characters indicating the damage assessment for the rental item 310 upon return to the owner 308; however, in alterative embodiments any suitable data representation may be used to terminate the sequence. The received code 304a includes a terminating digit 304a2 "0" indicating that the damage assessment for the returned rental item is "no damage." The received code 304b includes a terminating digit 304b2 "1" indicating that the damage assessment for the returned rental item is "minor damage." The received code 304c includes a terminating digit 304c2 "2" indicating that the damage assessment for the returned rental item is "major damage." In embodiments where greater than three received codes 304a-c are used, the terminating digits may represent a different ranking scale indicating more than three degrees of damage (e.g., degrees of damage represented by a scale of 1-10 indicated by terminating digits 304a2-304j2, degrees of damage represented by a scale of 1-n indicated by terminating digitals 304a2-304n2). In yet another embodiment, the character in the terminating position is a letter indicating the damage assessment. In yet another embodiment, the damage assessment is indicated by a character at a predetermined or a random position in the received code, or may be a separately transmitted character.

The borrower 306 obtains possession of or otherwise inspects (either physically or virtually) the rental item 310 from the owner 308 and provides the pickup code 302 to the owner 308. A user identifier 302a is either pre-pended or appended to or otherwise included with the pickup code 302. The borrower 306 manually enters the user identifier 302a or, the user identifier 302a is automatically added by the user device from which the pickup code 302 is sent. The borrower 306 sends an appended pickup code 302b to the owner 308. The owner 308 sends the appended pickup code 302b to the central controller 300. The user identifier 302a of the appended pickup code 302b is used by the central controller 300 to determine whether the appended pickup code 302b is valid. The central controller 300 verifies that the pickup code 302b sent by the owner 308 corresponds to the pickup code 302 generated for and initially sent to the borrower 306 by accessing the database 312 and performing a lookup based the user identifier 302a portion of the pickup code 302b.

When the borrower 306 returns the rental item 310 to the owner 308, the owner 308 selects a received code 304a-c reflecting the owner's damage or condition assessment of the rental item 310 and/or reflecting a characteristic or characteristics of the rental transaction. A user identifier 304d is pre-pended to or otherwise included with the selected received code 304c. The owner 308 sends the pre-pended, selected received code 304e to the borrower 306. The portion of the received code 304a1-c1 preceding the terminating digit 304a2-304c2 is preferably different for each of the received codes initially sent by the central controller 300 to the owner 308. The portion of the received code 304a1-c1 preceding the terminating digit 304a2-304c2 is preferably not ordered in a recognizable or particular sequence, but rather this portion of the received codes is intended to be unrecognizable to the owner and borrower. The differing preceding portions 304a1-c1 of the received codes 304a-c is to help prevent fraud. For example, if all portions of the received codes were identical but for the terminating digit, in a situation where the owner 308 sends to the borrower 306, the received code 304c for the damage assessment indicating "major damage" to the rental item 310, the borrower 308 may subsequently alter the terminating digit of the received code 304c to indicate "minor damage" or "no damage" before sending the received code 304c to the central controller 300.

The pre-pended, selected received code 304e sent by the borrower 308 to the central controller 300. The pre-pended, selected received code 304e is compared to corresponding received codes 304a-c stored in the database 312 of the central controller 300 based on the user identifier 304d, as described above.

Figure 4:
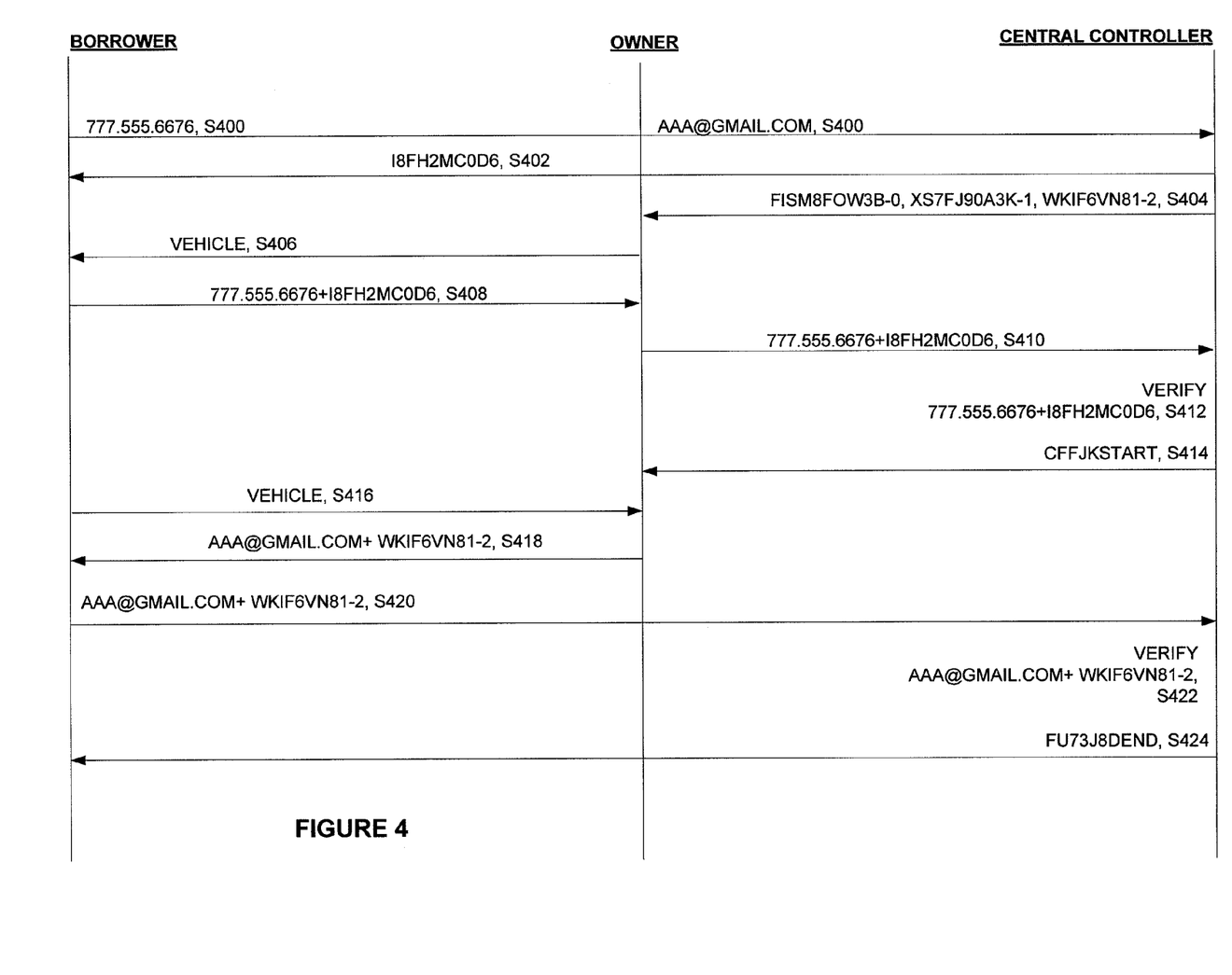
FIG. 4 is a process flow diagram for an exemplary rental transaction.

Referring now to FIG. 4, a process flow diagram for an exemplary rental transaction is shown. Although the following steps are presented in the below-described order, those skilled in the art would readily appreciate that the following steps may occur or may be performed in a different suitable order. Shown in table 1 is an exemplary listing for a rental item.

TABLE 1

Exemplary Listing for a Rental Item

| Description Information | Make | Acura |
|---|---|---|
| | Model | TSX |
| | Color | Red |
| | VIN | 872641J441 |
| | Date of purchase | Sep. 17, 2005 |
| Retail Price | | $10000 |
| Average Sale Price | | $6000 |
| Replacement Cost | | $7000 |
| Major Damage Cost | | $3000 |
| Minor Damage Cost | | $500 |
| Rental Fee/Day | | $150 |

In Step S400, a potential borrower initially reviews the exemplary listing for the vehicle shown in Table 1 and subsequently executes a lease agreement for the vehicle, or otherwise demonstrates his/her desire to enter into the lease agreement and to carry out the rental transaction. Upon executing the lease agreement, the lease agreement along with user identifiers for the borrower and the owner are electronically stored by the central controller in the database. User identifiers stored in the database for this example include, but are not limited to name, mobile device number, landline telephone number, electronic mail address, username and password and IP address for each of the borrower and the owner. In one embodiment, a subset of the user identifiers stored for each of the borrower and the owner are visible to the other party. The party identified by the user identifiers may choose which of the user identifiers are visible to the other party during the rental transaction. In step S402 the central controller generates and sends the pickup code to the borrower by a SMS text message sent to the borrower's mobile device. In step S404, the central controller generates and sends three received codes to the owner by an electronic mail sent through the Internet to the owner's PDA.

Subsequently, in step S406, the borrower obtains control and/or possession of the vehicle/rental item, verifies the condition of the vehicle/rental item. In step S408, the borrower appends a user identifier to the pickup code and sends an SMS text message containing the appended pickup code to the owner's PDA. In this example, the user identifier is a mobile device number. However, it may be readily appreciated by those skilled in the art that the user identifier is not necessarily related to the mode of communication used to communicate the pickup code. For example, the borrower may append an email address or an IP address to the pickup code. The user identifier may be any user identifier stored in the database of the central controller, or alternatively may be stored separately from the central controller. Communication between the borrower and the owner occurs in accordance with the user identifiers stored for each of the borrower and owner in the database of the central controller. A user identifier stored in the database that is an email address for the owner indicates that the borrower may email or otherwise electronically transmit the pickup code to the owner. If the user identifier included a mobile device number and an email address for the owner, the borrower could communicate with the owner by: a) calling the owner to provide the appended pickup code; b) sending an SMS message containing the appended pickup code to the owner; and/or c) emailing the appended pickup code to the owner.

Next in step S410, the owner sends the appended pickup code to the central controller by sending the appended pickup code from the owner's PDA to a website for the central controller. The owner logs into the website by entering a username and/or password and enters the appended pickup code to the website. In step S412, the central controller verifies that the appended pickup code sent by the owner corresponds to the pickup code generated for and initially sent to the borrower by accessing the database and performing a lookup based on the mobile device number appended to the pickup code. Next, in step S414, the central controller sends a rental period start code to the owner via an electronic mail to the owner's PDA sent through the Internet confirming the start of the rental period for the vehicle/rental item exchanged between the owner and borrower. During the rental period, the borrower maintains control and/or possession of the vehicle/rental item.

In step S416, at the end of the rental period, the borrower returns the vehicle/rental item to the owner. The owner selects one of the three received codes initially sent by the central controller indicating that major damage has occurred to the vehicle/rental item. Subsequently in step S418, the selected received code is pre-pended with the owner's user identifier and sent to the borrower contained in an SMS text message to the borrower's cellular phone. In this example, the owner's electronic mail address is pre-pended to the selected received code.

In step S420, the borrower sends the pre-pended received code to the central controller. Next, in step S422, the central controller verifies that the pre-pended received code sent by the borrower in step S418 corresponds to one of the received codes initially sent to the owner by accessing the database to determine whether the user identifier portion of the received code corresponds to the owner, based on a lookup using the electronic mail address pre-pended to the received code. Finally, in step S424, the central controller sends a rental transaction end code to the borrower indicating that the rental transaction has terminated.

The borrower preferably has three options for responding to the damage assessment made by the owner. The borrower may: a) retain possession of the vehicle and be charged the replacement cost (e.g., $7000); b) agree with the owner's damage assessment, return the vehicle and pay the major damage cost (e.g., $3000); or c) dispute the owner's damage assessment and pay the average of the major damage cost associated with the owner's damage assessment and the minor damage cost associated with the borrower's damage assessment after returning the received code to the central controller (e.g., $1750). Shown in Table 2 are exemplary damage amounts exchanged between the owner and the borrower.

TABLE 2

Damage Amounts Exchanged Between the Owner and Borrower

| Owner's Assessment | Borrower's Assessment | Damage Amount |
|---|---|---|
| Major Damage | No Damage | $1500 |
| Major Damage | Minor Damage | $1750 |
| Major Damage | Major Damage | $3000 |
| Minor Damage | No Damage | $250 |
| Minor Damage | Minor Damage | $500 |

In one non-limiting embodiment, the replacement value for the rental item is charged to the borrower (e.g., credit card or debit account) prior to or upon initiating the rental transaction. For example, the replacement value for the rental item may be charged to the borrower upon executing the lease agreement or when the pickup code is received at the central controller. In one embodiment, the central controller does not verify the pickup code if the charge cannot be made (e.g., if credit card number is invalid or if the credit card carries a balance at or above the credit limit). The replacement value charge to the borrower's account is either voided after the rental transaction terminates or posted if the borrower fails to return the rental item.

In another non-limiting embodiment, the owner and borrower rate and review each other based on each party's conduct during the rental transaction. The ratings and reviews for the borrower and owner are stored in a user profile and are displayed prior to initiating the rental transaction. The user profile for the owner is displayed along with the listing for the rental item. The central controller may also track the history, dependability, quality and performance of the rental item.

In yet another embodiment, the pickup code and the received codes are communicated among proxies for either or both the borrower or owner. For example, a borrower may send the pickup code to the owner's shipping agent and the owner's shipping agent may send the pickup code to the central controller.

In one circumstance, the borrower retains possession of the rental item beyond the expiration of the rental period. The borrower may choose not to return the rental item, may forget to return the rental item, or may encounter difficulties in returning the rental item. In another circumstance, the owner may choose not to send the received code to the borrower, may forget to send the received code to the borrower, may be late in sending the received code to the borrower or may encounter difficulties in sending the received code to the borrower. The central controller determines which situation has prevented the received codes from being sent to the rental system, based on information provided by either or both the owner and the borrower. In one embodiment, either circumstance will give rise to an expiration of the received codes. The central controller sends multiple additional received codes to the owner to complete the transaction. In another embodiment, the central controller extends the rental period until the borrower sends the received code to the central controller, or until the expiration of a preset amount of time. In both circumstances, the central controller will prompt the appropriate party to take action. In another embodiment, both the owner and the borrower agree to extend the rental period. For example, the borrower and the owner may agree to extend the rental period via an Internet website. The central controller generates at least one new received code and sends the received codes to the owner. When the borrower returns the rental item to the owner, the owner provides the borrower with one of the new received codes. The old received codes initially generated for and sent to the owner at the outset of the rental transaction are therefore invalid.

It is noted that the foregoing examples have been provided merely for the purpose of explanation and are in no way to be construed as limiting of the present invention. While the present invention has been described with reference to a preferred embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A method of facilitating a rental transaction of a tangible item, the method comprising:
    electronically transmitting a plurality of return codes, generated by a central controller, to a lessor;
    communicating a lessee pickup code from a lessee to the lessor upon exchanging the tangible item between the lessor and the lessee;
    electronically transmitting the lessee pickup code from the lessor to the central controller;
    initiating a rental period upon verifying, by the central controller, the lessee pickup code;
    communicating a return code, the return code being selected by the lessor from the plurality of return codes, from the lessor to the lessee, upon return of the tangible item to the lessor; and
    electronically transmitting the return code selected from the plurality of return codes, from the lessee, to the central controller.

2. The method according to claim 1, further comprising electronically transmitting the lessee pickup code, generated by the central controller, to the lessee.

3. The method according to claim 2, wherein the lessee adds a user identifier associated with the lessee to the lessee pickup code.

4. The method according to claim 2, wherein the lessor adds a user identifier associated with the lessor to the lessee pickup code.

5. The method according to claim 1, wherein the lessor adds a user identifier associated with the lessor to the return code.

6. The method according to claim 5, further comprising verifying, based on a comparison of the user identifier added to the return code and a plurality of user identifiers for the lessor stored at the central controller, that the return code submitted by the lessee comprises one of the plurality of return codes generated by the central controller and electronically transmitted to the lessor.

7. The method according to claim 6, wherein the plurality of user identifiers for the lessor are associated with at least one of the plurality of return codes and a plurality of user identifiers for the lessee.

8. The method according to claim 7, wherein verifying the lessee pickup code comprises comparing the user identifier added to the lessee pickup code and a plurality of user identifiers for the lessee stored at the central controller, and determining that the lessee pickup code submitted by the lessor comprises the lessee pickup code generated by the central controller and electronically transmitted to the lessee.

9. The method according to claim 8, wherein the plurality of user identifiers for the lessee are associated with at least one of a lessee pickup code and a plurality of user identifiers for the lessor.

10. The method according to claim 1, wherein the lessee adds a user identifier associated with the lessee to the return code.

11. The method according to claim 10, further comprising verifying, based on a comparison of the user identifier added to the return code and an association among a plurality of user identifiers for the lessee and at least one of a plurality of user identifiers for the lessor and the return code stored at the central controller, that the return code submitted by the lessee comprises one of the plurality of return codes generated by the central controller and electronically transmitted to the lessor.

12. The method according to claim 11, wherein the plurality of user identifiers for the lessor are associated with the return code.

13. The method according to claim 10, wherein verifying the lessee pickup code comprises comparing the user identifier added to the lessee pickup code and an association among a plurality of user identifiers for the lessor and at least one of a plurality of user identifiers for the lessee and the lessee pickup code stored at the central controller, and determining that the lessee pickup code submitted by the lessor comprises the lessee pickup code generated by the central controller and electronically transmitted to the lessee.

14. The method according to claim 13, wherein the plurality of user identifiers for the lessee are associated with the lessee pickup code.

15. The method according to claim 1, further comprising verifying, based on a comparison of a user identifier associated with a mode of communication by which the return code is submitted to the central controller and an association among a plurality of user identifiers for the lessee and at least one of a plurality of user identifiers for the lessor and the return code stored at the central controller, that the return code submitted by the lessee comprises one of the plurality of return codes generated by the central controller and electronically transmitted to the lessor.

16. The method according to claim 15, wherein the plurality of user identifiers for the lessor are associated with the return code.

17. The method according to claim 1, further comprising electronically transmitting, from the central controller, a commencement message confirming commencement of the rental period.

18. The method according to claim 1, further comprising electronically transmitting a confirmation message from the central controller to the lessee indicating receipt of the return code.

19. The method according to claim 1, wherein the return code indicates that the tangible item was returned to the lessor.

20. The method according to claim 1, wherein at least a portion of the return code indicates a level of damage to the tangible item.

21. The method according to claim 20, wherein the portion of the return code is identifiable by the lessee and the lessor as indicating the level of damage.

22. The method according to claim 1, wherein the lessee pickup code and the return code are electronically transmitted by at least one of: Bluetooth, short messaging system, electronic mail, dual-tone multi-frequency (DTMF) signaling, intranet, Internet and wireless communication.

23. The method according to claim 1, wherein the lessee pickup code and the return code are randomly generated by the central controller.

24. The method according to claim 23, wherein the lessee pickup code and the return code comprise sequences of randomly generated alphanumeric characters.

25. The method according to claim 1, wherein the lessee pickup code and the return code are communicated via at least one of electronic and physical transmission.

26. The method according to claim 1,
wherein the lessee comprises at least one of: an agent for the lessee, a proxy for the lessee, and an entity associated with the lessee.

27. The method according to claim 1,
wherein the lessor comprises at least one of: an agent for the lessor, a proxy for the lessor, and an entity associated with the lessor.

28. A method of facilitating a rental transaction of a tangible item, the method comprising:
electronically transmitting a lessee pickup code, generated by a central controller, to a lessee;
communicating the lessee pickup code from the lessee to a lessor upon exchanging the tangible item between the lessor and the lessee;
electronically transmitting the lessee pickup code from the lessor to the central controller;
initiating a rental period upon verifying, by the central controller, the lessee pickup code;
communicating a return code from the lessor to the lessee, upon return of the tangible item to the lessor; and
electronically transmitting the return code from the lessee to the central controller,
wherein verifying the lessee pickup code comprises comparing a user identifier associated with a mode of communication by which the lessee pickup code is submitted to the central controller with an association among a plurality of user identifiers for the lessor stored at the central controller and at least one of a plurality of user identifiers for the lessee and the lessee pickup code stored at the central controller, and determining that the lessee pickup code submitted by the lessor comprises the lessee pickup code generated by the central controller and electronically transmitted to the lessee.

29. The method according to claim 28, wherein the plurality of user identifiers for the lessee are associated with the lessee pickup code.

30. A method of facilitating the rental of at least one tangible item, the at least one tangible item being transferred between a lessee and a lessor, the method comprising:
electronically transmitting a lessee pickup code to the lessee, the lessee pickup code being received at a lessee interface;
electronically transmitting a plurality of return codes to lessor, the plurality of return codes being received at a lessor interface;
verifying submission, using a central controller processor, of the lessee pickup code by the lessor upon receiving the lessee pickup code from the lessor, the lessee communicating the lessee pickup code to the lessor upon obtaining possession of the at least one tangible item; and
verifying submission, using the central controller processor, of a return code by the lessee upon receiving the return code from the lessee, the lessor communicating the return code to the lessee upon return of the at least one tangible item,
wherein the lessor selects the return code from the plurality of return codes.

31. The method according to claim 30, wherein a central controller receives the lessee pickup code and the return code, and wherein the central controller verifies the submission of the lessee pickup code and the return code.

32. The method according to claim 31, further comprising electronically transmitting, from the central controller, a message confirming commencement of a rental period upon receiving the lessee pickup code.

33. The method according to claim 32, wherein the return code is invalid after the expiration of the rental period.

34. The method according to claim 33, wherein the central controller extends the rental period by electronically transmitting at least one additional return code to the lessor.

35. The method according to claim 33, wherein the central controller extends the rental period by prompting the lessee to electronically transmit the return code.

36. The method according to claim 31, wherein a lessee user identifier is added to the lessee pickup code, and wherein a lessor user identifier is added to the return code.

37. The method according to claim 36, wherein the lessee pickup code is verified by the central controller based on a comparison of the lessee user identifier and a plurality of user identifiers stored at the central controller, and wherein the return code is verified by the central controller based on a comparison of the lessor user identifier and the plurality of user identifiers stored at the central controller.

38. The method according to claim 37, wherein the plurality of user identifiers comprise: a telephone number, an email address, an account number, a user name, a system-generated identifier and an Internet Protocol (IP) address.

39. The method according to claim 30 wherein each of the plurality of return codes indicate a degree of damage sustained by the at least one tangible item.

40. The method according to claim 39, wherein the lessor selects the return code from the plurality of return codes based on the degree of damage sustained by the at least one tangible item.

41. The method according to claim 30, wherein the lessee pickup code and the return codes are communicated via at least one of electronic and physical transmission.

42. The method according to claim 30,
wherein the lessee comprises at least one of: an agent for the lessee, a proxy for the lessee, and an entity associated with the lessee.

43. The method according to claim 30,
wherein the lessor comprises at least one of: an agent for the lessor, a proxy for the lessor, and an entity associated with the lessor.

44. A system for facilitating the exchange of at least one tangible item, the at least one tangible item being exchanged between a lessor and a lessee, the system comprising:
a first interface configurable to electronically transmit a lessee pickup code to the lessee;
a second interface configurable to electronically transmit a return code to the lessor;
a first verifying processor configurable to verify submission of the lessee pickup code by the lessor upon receiving the lessee pickup code from the lessor, the lessee communicating the lessee pickup code to the lessor upon obtaining possession of the at least one tangible item; and a second verifying processor configurable to verify submission of the return code by the lessee upon receiving the return code from the lessee, the lessor communicating the return code to the lessee upon return of the at least one tangible item, wherein a reimbursement policy determines a reimbursement value to compensate the lessor for either damage to or loss of the at least one tangible item, wherein the reimbursement value is based on one of: a repair cost and a replacement cost for the at least one tangible item, and wherein the replacement cost is determined based on information obtained from at least one of the Internet and an auction site.

45. The system according to claim 44, wherein the reimbursement policy comprises: information associated with the at least one tangible item, the replacement cost, a rental fee and at least one repair cost based on a degree of damage to the at least one tangible item.

46. The system according to claim 44, wherein the lessee pickup code and the return code are communicated via at least one of electronic and physical transmission.

47. The system according to claim 44, wherein the lessee comprises at least one of: an agent for the lessee, a proxy for the lessee, and an entity associated with the lessee.

48. The system according to claim 44, wherein the lessor comprises at least one of: an agent for the lessor, a proxy for the lessor, and an entity associated with the lessor.

49. A method of mitigating risk in a business transaction, the method comprising:

electronically communicating an initiating code to a first party, the initiating code being received at a first interface;

electronically communicating a terminating code to a second party, the terminating code being received at a second interface;

verifying submission, using a central controller processor, of the initiating code by the second party upon receiving the initiating code from the first party, the first party communicating the initiating code to the second party upon an occurrence of a first event; and verifying submission, using the central controller processor, of the terminating code by the first party upon receiving the terminating code from the second party, the second party communicating the terminating code to the first party upon occurrence of a second event, wherein the business transaction is conducted in accordance with a transaction agreement, and wherein the terminating code is selected from a plurality of terminating codes electronically communicated to the second party.

50. The method according to claim 49, wherein the plurality of codes indicate a degree to which the business transaction varies from the transaction agreement.

51. The method according to claim 49, wherein the transaction agreement designates a value for compensating the second party.

52. The method according to claim 49, wherein the first event initiates the business transaction.

53. The method according to claim 49, wherein the second event terminates the business transaction.

54. The method according to claim 49, wherein the initiating code and the terminating code are randomly generated by a central controller.

55. The method according to claim 54, wherein the initiating code and the terminating code comprise sequences of randomly generated alphanumeric characters.

56. The method according to claim 54, wherein a first party user identifier is added to the initiating code, and wherein a second party user identifier is added to the terminating code.

57. The method according to claim 54, wherein a first party user identifier is added to the terminating code and a second party user identifier is added to the initiating code.

58. The method according to claim 49, wherein the initiating code and the terminating code are electronically communicated by at least one of: Bluetooth, short messaging system, electronic mail, dual-tone multi-frequency (DTMF) signaling, intranet, Internet and wireless communication.

59. The method according to claim 49, wherein the initiating code and the terminating code are communicated via at least one of electronic and physical transmission.

60. The system according to claim 59, wherein the initiating code and the terminating code are communicated via at least one of electronic and physical transmission.

61. The method according to claim 49,
wherein the first party comprises at least one of: an agent for the first party, a proxy for the first party, and an entity associated with the first party.

62. The method according to claim 49,
wherein the second party comprises at least one of: an agent for the second party, a proxy for the second party, and an entity associated with the second party.

63. A method of mitigating risk in a business transaction, the method comprising:

electronically communicating an initiating code to a first party, the initiating code being received at a first interface;

electronically communicating a terminating code to a second party, the terminating code being received at a second interface;

verifying submission, using a central controller processor, of the initiating code by the second party upon receiving the initiating code from the first party, the first party communicating the initiating code to the second party upon an occurrence of a first event; and verifying submission, using the central controller processor, of the terminating code by the first party upon receiving the terminating code from the second party, the second party communicating the terminating code to the first party upon occurrence of a second event, wherein a first party user identifier is added to the initiating code, and wherein a second party user identifier is added to the terminating code, wherein the initiating code and the terminating code are randomly generated by a central controller, and wherein the initiating code is verified by the central controller based on a comparison of the first party user identifier and a plurality of user identifiers for the first party, stored at the central controller, and wherein the terminating code is verified by the central controller based on a comparison of the second party user identifier and a plurality of user identifiers for the second party stored at the central controller.

64. The method according to claim 63, wherein the plurality of user identifiers for the first party are associated with the initiating code, and wherein the plurality of user identifiers for the second party are associated with the terminating code.

65. The method according to claim 63, wherein the plurality of user identifiers comprise: a telephone number, an email address, an account number, a user name, a system-generated identifier and an Internet Protocol (IP) address.

66. A method of mitigating risk in a business transaction, the method comprising:
- electronically communicating an initiating code to a first party, the initiating code being received at a first interface;
- electronically communicating a terminating code to a second party, the terminating code being received at a second interface;
- verifying submission, using a central controller processor, of the initiating code by the second party upon receiving the initiating code from the first party, the first party communicating the initiating code to the second party upon an occurrence of a first event; and
- verifying submission, using the central controller processor, of the terminating code by the first party upon receiving the terminating code from the second party, the second party communicating the terminating code to the first party upon occurrence of a second event,
- wherein the initiating code and the terminating code are randomly generated by a central controller,
- wherein a first party user identifier is added to the terminating code and a second party user identifier is added to the initiating code, and
- wherein the terminating code is verified based on a comparison of the first party user identifier added to the terminating code and an association among a plurality of user identifiers for the first party and at least one of a plurality of user identifiers for the second party and the terminating code stored at the central controller, that the terminating code submitted by the first party comprises the return code generated by the central controller.

67. A method of mitigating risk in a business transaction, the method comprising:
- electronically communicating an initiating code to a first party, the initiating code being received at a first interface;
- electronically communicating a terminating code to a second party, the terminating code being received at a second interface;
- verifying submission, using a central controller processor, of the initiating code by the second party upon receiving the initiating code from the first party, the first party communicating the initiating code to the second party upon an occurrence of a first event; and
- verifying submission, using the central controller processor, of the terminating code by the first party upon receiving the terminating code from the second party, the second party communicating the terminating code to the first party upon occurrence of a second event,
- wherein the initiating code and the terminating code are randomly generated by a central controller,
- wherein a first party user identifier is added to the terminating code and a second party user identifier is added to the initiating code, and
- wherein the initiating code is verified based on a comparison of the second party user identifier added to the initiating code and an association among a plurality of user identifiers for the second party and at least one of a plurality of user identifiers for the first party and the initiating code stored at the central controller, that the initiating code submitted by the second party comprises the initiating code generated by the central controller.

68. A method of mitigating risk in a business transaction, the method comprising:
- electronically communicating an initiating code to a first party, the initiating code being received at a first interface;
- electronically communicating a terminating code to a second party, the terminating code being received at a second interface;
- verifying submission, using a central controller processor, of the initiating code by the second party upon receiving the initiating code from the first party, the first party communicating the initiating code to the second party upon an occurrence of a first event; and
- verifying submission, using the central controller processor, of the terminating code by the first party upon receiving the terminating code from the second party, the second party communicating the terminating code to the first party upon occurrence of a second event,
- wherein the initiating code and the terminating code are randomly generated by a central controller, and
- wherein verifying the initiating code comprises comparing a user identifier associated with a mode of communication by which the initiating code is submitted to the central controller with an association among a plurality of user identifiers for the second party stored at the central controller and at least one of a plurality of user identifiers for the first party and the initiating code stored at the central controller, and determining that the initiating code submitted by the second party comprises the initiating code generated by the central controller.

69. A method of mitigating risk in a business transaction, the method comprising:
- electronically communicating an initiating code to a first party, the initiating code being received at a first interface;
- electronically communicating a terminating code to a second party, the terminating code being received at a second interface;
- verifying submission, using a central controller processor, of the initiating code by the second party upon receiving the initiating code from the first party, the first party communicating the initiating code to the second party upon an occurrence of a first event; and
- verifying submission, using the central controller processor, of the terminating code by the first party upon receiving the terminating code from the second party, the second party communicating the terminating code to the first party upon occurrence of a second event,
- wherein the initiating code and the terminating code are randomly generated by a central controller, and
- wherein verifying the terminating code comprises comparing a user identifier associated with a mode of communication by which the terminating code is submitted to the central controller and an association among a plurality of user identifiers for the first party and at least one of a plurality of user identifiers for the second party and the terminating code stored at the central controller, that the terminating code submitted by the first party comprises the terminating code generated by the central controller.

* * * * *